United States Patent
Bender et al.

(10) Patent No.: US 10,901,570 B2
(45) Date of Patent: Jan. 26, 2021

(54) INPUT PLACEMENT CONTROL GUIDANCE ON A DISPLAY

(71) Applicant: International Business Machines Corporation, Armonk, NY (US)

(72) Inventors: Michael Bender, Rye Brook, NY (US); John F. Kelley, Polk City, FL (US); Todd P. Seager, Orem, UT (US); Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,426

(22) Filed: Nov. 26, 2018

(65) Prior Publication Data

US 2020/0167056 A1    May 28, 2020

(51) Int. Cl.
*G06F 3/048*     (2013.01)
*G06F 3/0481*    (2013.01)
*G06F 3/0354*    (2013.01)
*G06F 3/0484*    (2013.01)

(52) U.S. Cl.
CPC ...... *G06F 3/04812* (2013.01); *G06F 3/03541* (2013.01); *G06F 3/04842* (2013.01)

(58) Field of Classification Search
CPC ............. G06F 3/04812; G06F 3/03541; G06F 3/04842
USPC .................................................. 345/156–184
See application file for complete search history.

(56) References Cited

U.S. PATENT DOCUMENTS

| | | | | |
|---|---|---|---|---|
| 5,298,890 A | * | 3/1994 | Kanamaru | .......... G06F 3/04842 345/157 |
| 6,493,008 B1 | | 12/2002 | Yui | |
| 9,612,743 B2 | | 4/2017 | Grossman et al. | |
| 10,678,411 B2 | | 6/2020 | Reeves et al. | |
| 2006/0033712 A1 | * | 2/2006 | Baudisch | ................ G06F 3/038 345/157 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Carolyn R Edwards
(74) *Attorney, Agent, or Firm* — Heslin Rothenberg Farley & Mesiti P.C.; Michael Petrocelli, Esq.

(57) ABSTRACT

A method, computer program product, and a system where a processor(s) of a computing device identifies at least two displays coupled to the processor(s) to render visual objects to a user of the computing device, like a cursor, and processor(s) obtains instructions to render the cursor in various locations on the displays via an input device. The processor(s) obtain a display layout for the displays and resolutions of displays and generates an initial virtual desktop that includes physical real estate of the displays where the processor(s) renders visual objects. The processor(s) obtains a request and generates a simulacrum of the displays, in virtual space. The processor(s) displays, on a portion of the virtual desktop, the simulacrum. The processor(s) obtains, via the input device, a selection of a location on the simulacrum and automatically moves the cursor to a location on the virtual desktop that corresponds to the selected location.

20 Claims, 8 Drawing Sheets

(56) References Cited

U.S. PATENT DOCUMENTS

| | | | |
|---|---|---|---|
| 2007/0220448 A1 | 9/2007 | Trewin | |
| 2008/0229254 A1* | 9/2008 | Warner | G06F 3/04812 715/856 |
| 2010/0083122 A1* | 4/2010 | Kozloski | G06F 3/023 715/737 |
| 2010/0333041 A1* | 12/2010 | Fabrick, II | G06F 3/038 715/862 |
| 2011/0246904 A1* | 10/2011 | Pinto | G06F 9/452 715/740 |
| 2012/0146900 A1* | 6/2012 | Ishimoto | G06F 3/04812 345/157 |
| 2012/0272179 A1* | 10/2012 | Stafford | G06F 3/038 715/781 |
| 2012/0327104 A1* | 12/2012 | Schrauben | G01C 23/00 345/619 |
| 2018/0095623 A1 | 4/2018 | Haggar et al. | |
| 2018/0129510 A1* | 5/2018 | Zhang | G06F 9/452 |
| 2019/0324704 A1* | 10/2019 | Nam | G06F 3/1415 |
| 2020/0133459 A1 | 4/2020 | Bender et al. | |

OTHER PUBLICATIONS

List of IBM Patents or Patent Applications Treated as Related, Jul. 8, 2020, 2 pages.

* cited by examiner

INPUT PLACEMENT CONTROL GUIDANCE ON A DISPLAY

BACKGROUND

It is commonplace, particularly in professional settings, to utilize multiple monitors with a personal computing device. Many times, these monitors are set to different resolutions, are arranged in a non-standard configuration, and have physical space gaps between them, which are not consistent. Although this configuration is often selected by the user for visual purposes, the non-standard arrangement, including, in particular, the varying resolutions of the monitors, creates challenges regarding usability, particularly when a user attempts to make inputs via a graphical user interface (GUI) in one of the monitors. To place a visual representation of input control, such as a cursor, in a desktop location to make this input, a user may be required to "mouse" or otherwise navigate the visual representation of input control across a complicated path. The journey of the visual representation of input control, as navigated by a user utilizing an input device, such as a mouse of keyboard, can affect the efficiency of the user and the ability to make inputs in a timely manner. The more monitors utilized, the less standard the configuration, and the more differences in resolutions employed across monitors, the more complex the physical motions required to navigate the visual representation of input control to a desired location in a GUI, to make an input.

SUMMARY

Shortcomings of the prior art are overcome and additional advantages are provided through the provision of a method for automatically relocating input control to a selected display of a computing device. The method includes, for instance: identifying, by one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors; obtaining, by the one or more processors, based on the identifying, a display layout for the identified two or more displays; obtaining, by the one or more processors, based on the identifying, resolutions of the two or more displays; generating, by the one or more processors, based on the resolutions and the display layout, a virtual desktop comprising physical real estate of each of the two or more displays, wherein the physical real estate is useable by the one or more processors to render visual objects; obtaining, by the one or more processors, a request, via the input device; based on obtaining the request, generating, by the one or more processors, based on the resolutions and the display layout, a simulacrum of the two or more displays, in virtual space; displaying, by the one or more processors, on a portion of the virtual desktop, the simulacrum; obtaining, by the one or more processors, via the input device, a selection of a location on the simulacrum; and based on obtaining the selection, automatically moving, by the one or more processors, the cursor to a location on the virtual desktop that corresponds to the selected location on the simulacrum.

Shortcomings of the prior art are overcome and additional advantages are provided through the provision of a computer program product for automatically relocating input control to a selected display of a computing device. The computer program product comprises a storage medium readable by a processing circuit and storing instructions for execution by the processing circuit for performing a method. The method includes, for instance: identifying, by the one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors; obtaining, by the one or more processors, based on the identifying, a display layout for the identified two or more displays; obtaining, by the one or more processors, based on the identifying, resolutions of the two or more displays; generating, by the one or more processors, based on the resolutions and the display layout, a virtual desktop comprising physical real estate of each of the two or more displays, wherein the physical real estate is useable by the one or more processors to render visual objects; obtaining, by the one or more processors, a request, via the input device; based on obtaining the request, generating, by the one or more processors, based on the resolutions and the display layout, a simulacrum of the two or more displays, in virtual space; displaying, by the one or more processors, on a portion of the virtual desktop, the simulacrum; obtaining, by the one or more processors, via the input device, a selection of a location on the simulacrum; and based on obtaining the selection, automatically moving, by the one or more processors, the cursor to a location on the virtual desktop that corresponds to the selected location on the simulacrum.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
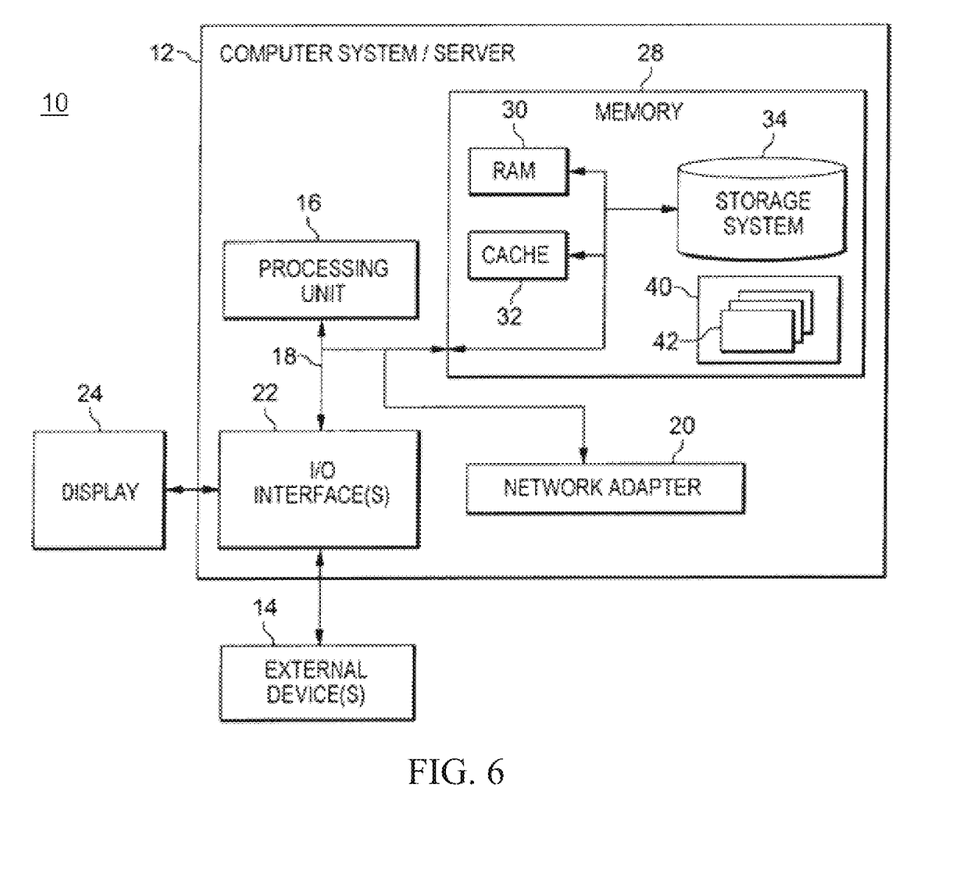
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computing system where program code executing on one or more processors provides a rapid and efficient method of placing a visual representation of input control (e.g., a cursor, an object) into a selected location on a selected visual display (e.g., screen, monitor), where the one or more processors are communicatively coupled to more than one display (e.g., screen, monitor) that collectively form the virtual desktop utilized by a user with an input device communicatively coupled to the one or more processors. In some embodiments of the present invention, a user utilizes an input device to select a specific location on a given display (e.g., screen, monitor) on a virtual desktop graphical user interface (GUI) comprised of multiple physical displays. To make this selection and orient the visual representation of input control (e.g., a cursor, an object), program code executing on one or more processors determines a layout of the multiple displays communicatively coupled to the one or more processors. To make this determination, in some embodiments of the present invention, the program code communicates with the operating system (OS) to initiate a model or simulacrum of the multiple displays (monitors, screens) comprising the desktop, in virtual space. The OS tracks data related to the displays, including the resolutions, the layout, and other settings and the thus, the program code can work with the OS to generate the simulacrum in virtual space. The program code obtains an indication, via an input device utilized by a user, of a position in the simulacrum and based on obtaining this indication, the program code moves the visual representation of input control (e.g., a cursor), to the indicated position on a GUI displayed on a physical display of the multiple that coordinates with the selected position on the simulacrum. Thus, the program code generates a simulacrum representing the GUIs of all the displays communicatively coupled to the one or more processors, and enables the user to utilize an input device to designate a position on a display. In some embodiments of the present invention, upon moving the visual representation of input control to a designated location on the display, the program code designates this selected display as a primary display, among the multiple displays that comprise the virtual desktop.

Embodiments of the present invention are inextricably tied to computing and provide significantly more than existing technological approaches to rendering a natural virtual navigation of a cursor through physical spaces between displays or monitors coupled to one or more processors. First, embodiments of the present invention are inextricably linked to computing based on providing a novel approach to a challenge that is unique to computing. Specifically, aspects of the present invention address how to locate a visual representation of input control (e.g., a cursor) at a selected location on a virtual desktop that is formed by multiple monitors communicatively coupled to one or more processors, in order to eliminate (currently required) excessive cursor movements. As described herein, the program code in embodiments of the present invention utilizes aspects of an OS of a computing device in order to generate a simulacrum that enables a user to reposition a cursor and/or designate a primary display, of the multiple displays, to receive input, with a minimum of inputs (e.g., keystrokes). Thus, both the technical challenge and the aspects of the present invention that address this challenge are unique to computing and therefore, inextricably linked to computing. Second, some current approaches to providing cursor placement that is more efficient and user friendly focus on providing visual assistance to users as they traverse a desktop comprised of multiple displays, thus, requiring the extensive navigation, but guiding this navigation with visuals. Other current approaches utilize diverse input devices to simplify the user entry, but not the navigation or guess at a desired location for a cursor based on monitoring cursor movements. Unfortunately, these approaches do not eliminate or address the issue of requiring large amounts of physical movement on the part of a user for the user to manipulate the cursor. In embodiments of the present invention, the program code generates a simulacrum that is a representation of all displays/monitors/windows and allows a user to select from the multiple windows directly, rather than requiring a user to utilize an input device to navigate a cursor across a desktop to a desired located on a given display. Embodiments of the present invention offer significantly more at least because unlike existing approaches to making cursor movement to a desired location simpler, in embodiments of the present invention, the program code determines a layout of multiple displays communicatively coupled to one or more processors, of a computing system, and generates a simulacrum of the multiple displays, utilizing the OS, of the computing system. The program code can generate the simulacrum, which allows a user to place a cursor on a selected display without physically navigating the input control (e.g., cursor) from one display to another across a path, but with a selection or input.

Figure 1:
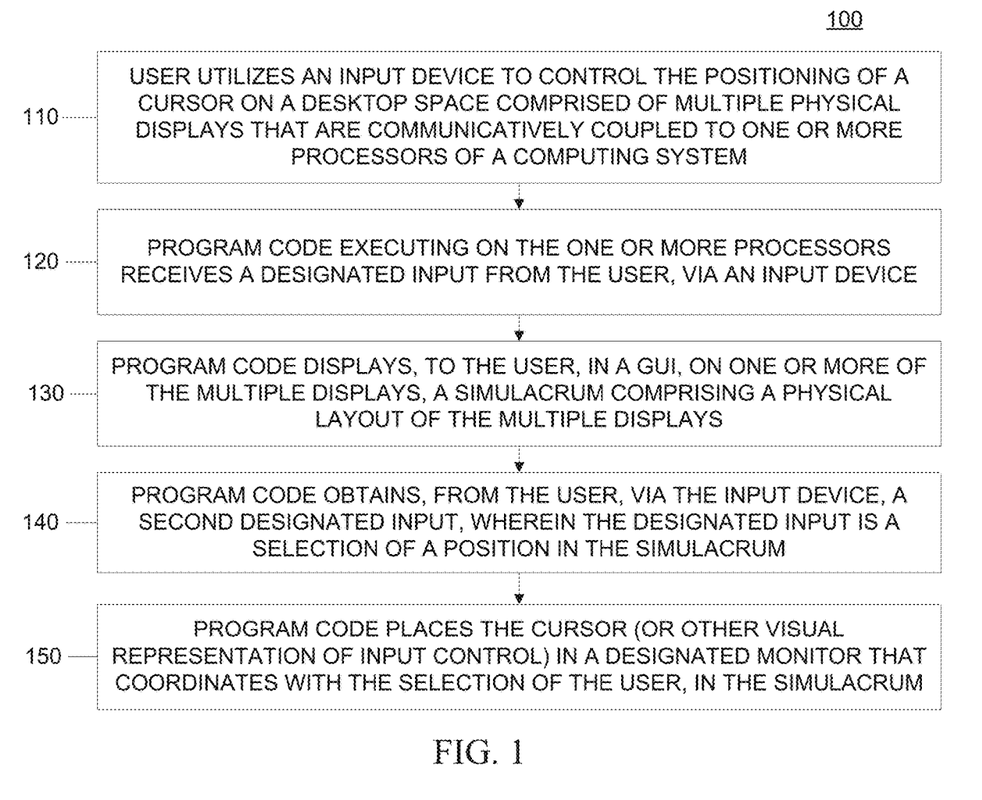
FIG. 1 is a workflow illustrating certain aspects of an embodiment of the present invention.

In embodiments of the present invention, rather than navigate a cursor across multiple monitors to terminate the journey at a desired location, program code enables a user to view a simulacrum of all displays coupled to a computing system, as understood by the OS of the computing system, and to position the visual representation of input control (e.g., a cursor) in a selected location on a particular display. FIG. 1 is a workflow 100 that provides a high level overview of a user experience utilizing aspects of some embodiments of the present invention. More details regarding the aspects that provide this functionality are discussed herein. However, given that embodiments of the present invention provide an improvement to user experience and user efficiency, FIG. 1 is provided as a non-limiting example of the improved user experience provided by some embodiments of the present invention.

Figure 2:
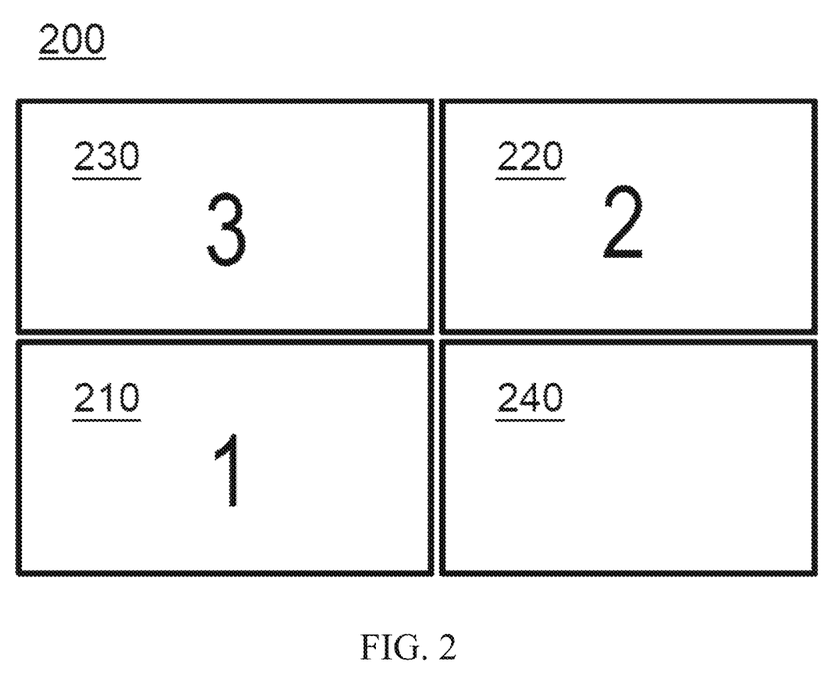
FIG. 2 is an illustration of aspects of a technical environment into which various aspects of an embodiment of the present invention can be implemented.

Referring to FIG. 1, in an embodiment of the present invention, a user utilizes an input device to control the positioning of a cursor on a desktop space comprised of multiple physical displays that are communicatively coupled to one or more processors of a computing system (110). Program code executing on the one or more processors receives a designated input from the user, via an input device (120). In some embodiments of the present invention, the designated input is the depression of a hotkey and receipt, by the one or more processors, of an instruction triggered by the hotkey. In some embodiments of the present invention, the designated input, rather than a hotkey, is movement of an input device in a specified manner. For example, the user could provide the designated input by moving the visual representation of input control (e.g., cursor) to an edge of one of multiple physical displays to an area where the OS does not resolve the representation on the desktop. FIG. 2 shows a configuration 200 of multiple physical displays, as understood by an OS. In this example, the input that would trigger the program code to generate the simulacrum would be a user moving a representation of input control (e.g., a cursor) to the location of the area 240, which is effectively walled off from cursor movement. Thus, the configuration, as understood by the OS, includes area 240, as well as a first monitor 210, a second monitor 220, and a third monitor 230. The program code (e.g., the OS) can (visually) resolve the input control representation (e.g., cursor) when navigated, via an input device, to the monitors 210 220 230, but not when placed in the area 240.

In some embodiments of the present invention, the OS generates the virtual desktop, which a user navigates, via an input device. To generate the virtual desktop, the OS identifies two or more displays communicatively coupled to the one or more processors (executing the program code). The two or more displays (e.g., FIG. 2, 210, 220, 230) are utilized by the OS to render visual objects, including the cursor, to a user of a computing device. The OS obtains instructions to render the cursor in various locations on the two or more displays via the input device. The OS can obtain the display layout for the identified two or more displays and the resolutions of the two or more displays. Based on the resolutions and the display layout, the OS generates a virtual desktop that includes the physical real estate of each of the two or more displays. The physical real estate is useable by the OS and other programs executed by the processor(s) of the computing device, to render visual objects.

Returning to FIG. 1, based on receiving the designated input, the program code displays, to the user, in a GUI, on one or more of the multiple displays, a simulacrum comprising a physical layout of the multiple displays (130). In some embodiments of the present invention, the simulacrum includes the visual display provided to the user in each of the multiple displays, including all windows (GUIs) resolved in each display. The program code can obtain the data to generate the simulacrum, at least in part, from the OS executing on the computing system. As understood by one of skill in the art, the OS retains the resolution of each monitor or display coupled to the computing device upon which the OS executes. The OS also retains a physical layout of the displays, as established through user interaction with the OS, through a GUI, described further in FIG. 3. However, the displayed simulacrum generated by the program code, based on data from the OS, can differ from the physical view of the displays (the actual locations of the displays in physical space), as understood by the user, because the simulacrum is based on the physical layout of the displays, as understood by the OS.

Returning to FIG. 1, in an embodiment of the present invention, the program code obtains, from the user, via the input device, a second designated input, wherein the designated input is a selection of a position in the simulacrum (140). In some embodiments of the present invention, the second designated input is a left-click. Based on obtaining the second designated input, the program code places the cursor (or other visual representation of input control) in a designated monitor that coordinates with the selection of the user, in the simulacrum (150). For example, if the user selects a given display depicted in the simulacrum, the program code places the cursor in the actual display represented in the simulacrum, based on the program code displaying the simulacrum in that position/location. In some embodiments of the present invention, the user can make a third designated input in the simulacrum displayed in a GUI. Based on obtaining this third designated input (e.g., a double-click) the program code places the cursor at the actual position coordinating with the simulacrum and designates the display in which the cursor was placed as the active or primary display, of the multiple displays. Thus, each virtual location in the simulacrum coordinates with a real, physical, location, on a display.

Figure 3:
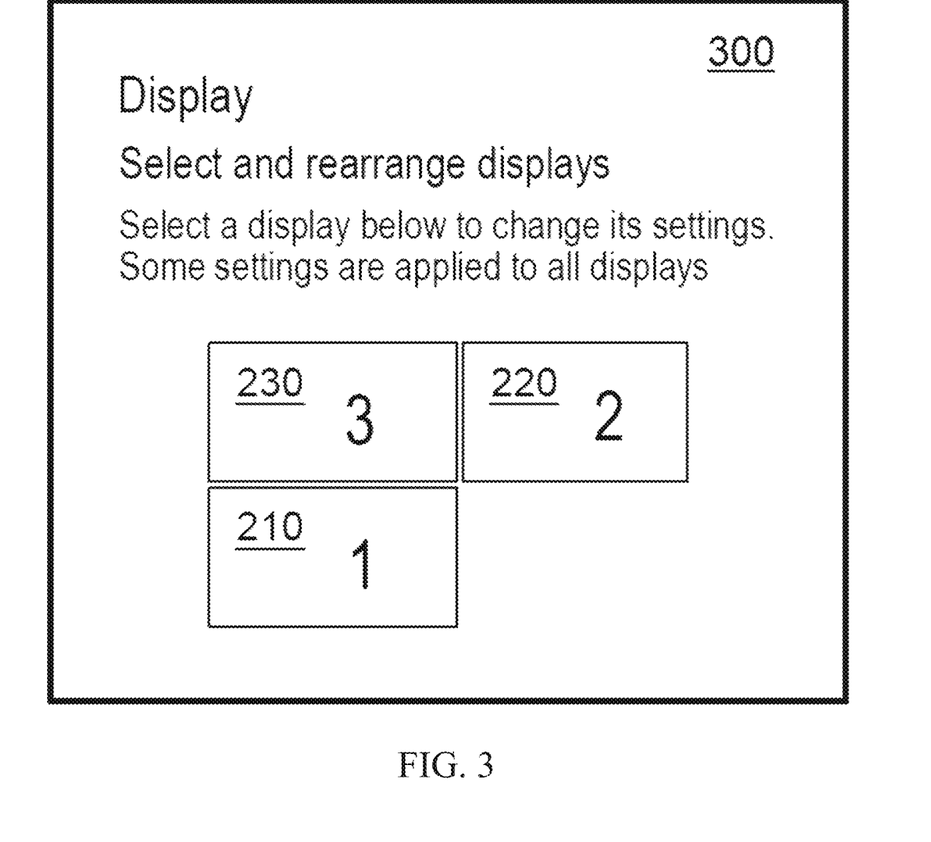
FIG. 3 is an illustration of aspects of a technical environment into which various aspects of an embodiment of the present invention can be implemented.

In some embodiments of the present invention, the program code obtains data regarding the displays or monitors communicatively coupled to a computer system, based on communicating with the OS installed on that computer system. In some embodiments of the present invention, the program code performing the described aspects is part of the OS itself. In either situation, the program code of the OS provides information about the displays communicatively coupled to the computing system. The OS can obtain this information based on enabling a user to configure various aspects of multiple displays of the computing system. To this end, FIG. 3 is an example of a dialog box 300 through which a user can manipulate display settings in communication with the OS of the computing device. As illustrated in FIG. 3, the OS displays three monitors (for consistency, the same monitors illustrated in FIG. 2), a first monitor 210, a second monitor 220, and a third monitor 230, which are communicatively coupled to the one or more processors of the computing device upon which the OS is installed. The user utilizes an input device, such as a mouse, to select the various monitors 210 220 230 and manipulate the settings associated with the monitors 210 220 230, including the resolution of each monitor 210 220 230. Based on the numbers assigned to the monitors, the user has selected a navigational pattern from the first monitor 210, to the second monitor 220, to the third monitor 230. The navigational information can also be retained by the OS and is utilized by the OS and/or the program code to automatically move input control from one monitor to another, based on obtaining a selection from a user, in some embodiments of the present invention.

Figure 4:
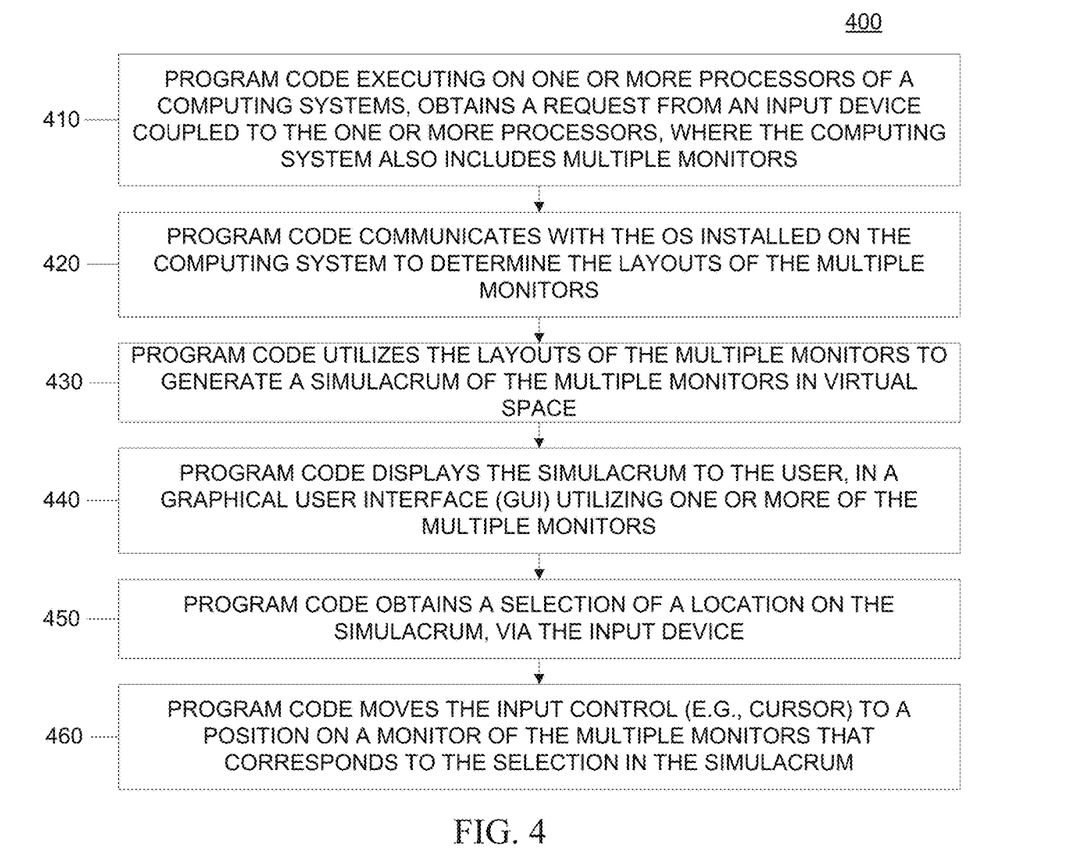
FIG. 4 is a workflow illustrating certain aspects of an embodiment of the present invention.

FIG. 4 is a workflow 400 that illustrates various aspects of some embodiments of the present invention. In some embodiments of the present invention, program code executing on one or more processors of a computing systems, obtains a request from an input device coupled to the one or more processors, where the computing system also includes multiple monitors (also referred to herein as displays) (410). In some embodiments of the present invention, the request may be triggered via a specific input by the user in the input device (e.g., via hotkey, mouse entry, combination of inputs, specified motion, etc.). Based on obtaining the request, the program code communicates with the OS installed on the computing system to determine the layouts of the multiple monitors (420). In some embodiments of the present invention, the program code is part of the program code of the OS. In other embodiments of the present invention, the program code is a middleware that communicates with the OS. In some embodiments of the present invention, the program code determines the layouts of the monitors by obtaining from the OS data including, but not limited to: resolutions of the monitors, layouts of the individual monitors (or displays), and/or a configuration of the monitors, as understood by the OS (based on automatically detecting and/or obtaining selections from a user, as illustrated in FIG. 3). The program code utilizes the layouts of the multiple monitors to generate a simulacrum of the multiple monitors in virtual space (430). In some embodiments of the present invention, program code of the OS generates the simulacrum responsive to the request. The program code displays the simulacrum to the user, in a graphical user interface (GUI) utilizing one or more of the multiple monitors (440). In some embodiments of the present invention, the program code displays the simulacrum is a window in which the input control (e.g., cursor) is presently located. In some embodiments of the present invention, the program code displays the simulacrum in an active window. In some embodiments of the present invention, the program code displays the simulacrum in a primary monitor (as designated in the OS), of the multiple monitors.

Figure 5:
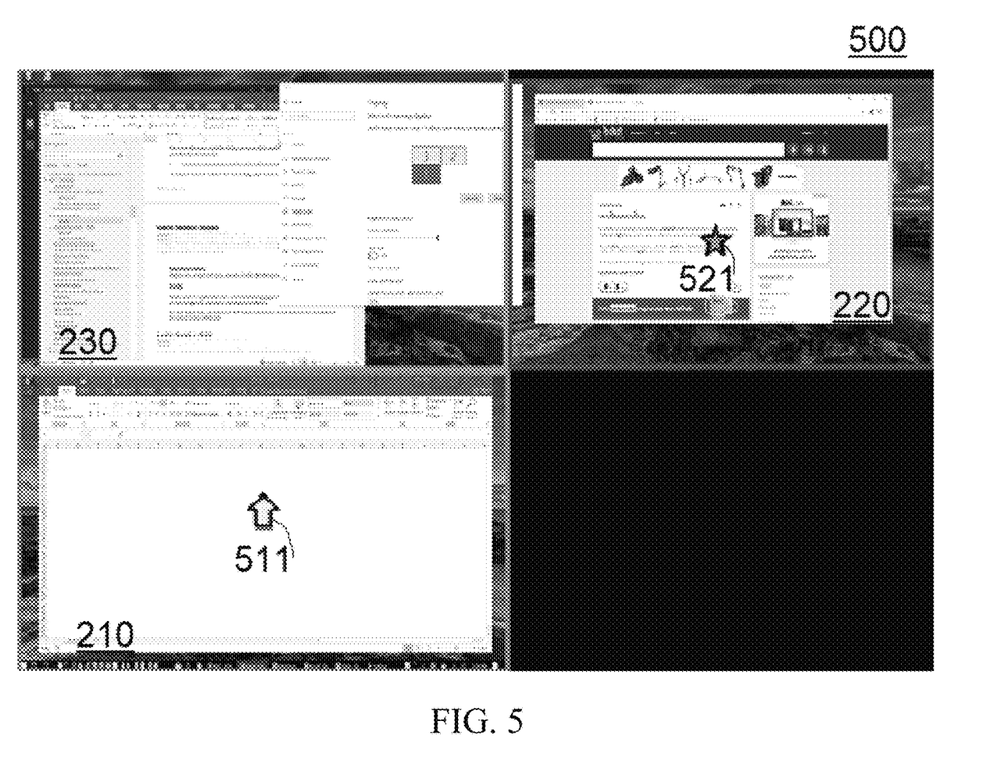
FIG. 5 is an illustration of aspects of some embodiments of the present invention.

FIG. 5 is an example of a simulacrum 500, generated by the program code, utilizing the OS (e.g., data from the OS and/or generated by program code of the OS), and displayed, by the program code, in a GUI. As discussed above, the program code can display the simulacrum in one or more of the multiple monitors of the computing system. As discussed above, the simulacrum can include all windows displayed to a user. For consistency, the simulacrum generated is in accordance with the understanding of the OS of the monitor configuration and settings, as illustrated in FIGS. 2-3. Thus, the simulacrum 400 includes representations of the windows displayed in the first monitor 210, the second monitor 220, and the third monitor 230, as understood by the OS. The configuration and settings can be manually configured by a user and/or detected automatically by one or more programs comprising the OS. The simulacrum 500 illustrates that the OS understand the monitors 210 220 230 to be in an "L" configuration. Thus, the simulacrum generated by the program code displays this configuration to the user, in a GUI.

Returning to FIG. 4, in some embodiments of the present invention, the program code obtains a selection of a location on the simulacrum, via the input device (450). In some embodiments of the present invention, the input device utilized by the user is the same input device utilized to trigger the generation of the simulacrum by the program code. In some embodiments of the present invention, different input devices communicatively coupled to the one or more processors are utilized to trigger the program code to generate the simulacrum and to make the selection (e.g., a keyboard and a mouse). For example, in one embodiments of the present invention, to select the location, a user single clicks a mouse on a preferred location on the simulacrum; this location is representative of a location on a monitor. In some embodiments of the present invention, the simulacrum can include a visual representation of a location of the input control (e.g., cursor) on the desktop, which is comprised of the multiple monitors.

Returning to FIG. 5, in the simulacrum 500, generated by the program code and displayed by the program code, to the user, the program code designates an input control position (e.g., cursor position) with a symbol, in this example, an arrow 511. Upon obtaining a selection of a location on the simulacrum, via the input device (e.g., FIG. 4, 450), the program code displays a symbol, for example, a star 521, at a location selected through the input device. In some embodiments of the present invention, the user confirms a selected position by utilizing a pre-defined input (e.g., single mouse click, hotkey, keystroke combination, specified motion, etc.). In some embodiments of the present invention, a user utilizes another pre-defined input to select a cursor position and to designate the monitor that will contain the cursor as the primary monitor (e.g., double mouse click, hotkey, keystroke combination, specified motion, etc.).

Returning to FIG. 4, based on obtaining the selection of the location, the program code moves the input control (e.g., cursor) to a position on a monitor of the multiple monitors that corresponds to the selection in the simulacrum (460). In some embodiments of the present invention, one or more programs of the OS move the input control, responsive to the selection.

In some embodiments of the present invention, the program code illustrates the path of the cursor from an originating position to the selected position, on the desktop. For example, the program code, when moving the input control, can create a visual that can be observed by the user (e.g., the program code flashes and/or animates the cursor briefly). In some embodiments of the present invention, the program code (and/or the OS), animates the cursor (i.e., input control) traveling to a desired pixel on a desired (selected) monitor, following a navigational path that the user would have to follow, utilizing the mouse, without the use of these described aspects. By displaying the path to the user, the program code effectively demonstrates, to the user, how to navigate a cursor from an existing position to the desired position, using manual movement, rather than the pre-defined inputs and simulacrum described herein.

In some embodiments of the present invention, the program code obtains a selection of a location on the simulacrum, via the input device (e.g., FIG. 4, 450), in a two-step process. First, the program code obtains a first input. Based on obtaining this first input, the program code, instead of moving the cursor directly to the selected position, moves the cursor to a pre-defined position (e.g., center) of the simulacrum. The program code then obtains a second input; the second input specifies which monitor (as illustrated in the simulacrum) of the multiple monitors in which to place the input control (e.g., cursor). In some embodiments of the present invention, the second input is a number representing which monitor of the monitors displayed in the simulacrum the user desires to the program code to place the input control (e.g., cursor).

Embodiments of the present invention include a computer-implemented method, a computer program product, and a computer system (such as a computing device), where one or more processors execute program code that identifies two or more displays communicatively coupled to the one or more processors, where the two or more displays are utilized by the one or more processors to render visual objects to a user of the computing device, where a cursor is a visual object of the visual objects, where the one or more processors obtain instructions to render the cursor in various locations on the two or more displays via an input device communicatively coupled to the one or more processors. The program code obtains, based on the identifying, a display layout for the identified two or more displays. The program code obtains, based on the identifying, resolutions of the two or more displays. The program code generates, based on the resolutions and the display layout, a virtual desktop comprising physical real estate of each of the two or more displays, where the physical real estate is useable by the one or more processors to render visual objects. The program code obtains a request, via the input device. Based on obtaining the request, the program code generates, based on the resolutions and the display layout, a simulacrum of the two or more displays, in virtual space. The program code displays, on a portion of the virtual desktop, the simulacrum. The program code obtains, via the input device, a selection of a location on the simulacrum. Based on obtaining the selection, the program code automatically moves the cursor to a location on the virtual desktop that corresponds to the selected location on the simulacrum.

In some embodiments of the present invention, the program code obtaining the display layout and the resolutions comprises the program code obtaining the display layout and the resolutions from an operating system installed on the computing device.

In some embodiments of the present invention, the program code obtaining the display layout and the boundaries, further comprises the program code communicating with the operating system utilizing a communication interface of the operating system.

In some embodiments of the present invention, the program code generating the virtual desktop comprises: the program code facilitating the operating system to generate the initial virtual desktop, and the program code obtaining the virtual desktop from the operating system.

In some embodiments of the present invention, the program code generating the simulacrum includes: the program code facilitating the operating system to generate the simulacrum, and the program code obtaining the simulacrum from the operating system.

In some embodiments of the present invention, the request is triggered, via the input device, by an action selected from the group consisting of: entry of a hotkey, entry of a pre-defined input on the input device, completion of entry of a pre-defined entry sequence, completion of entry of a combination of inputs, and completion of a specified motion utilizing the input device.

In some embodiments of the present invention, the input device is selected from the group consisting of: a mouse and a keyboard.

In some embodiments of the present invention, the selection of the location is facilitated via the input device with an action selected from the group consisting of: entry of a hotkey, entry of a pre-defined input on the input device, completion of entry of a pre-defined entry sequence, completion of entry of a combination of inputs, and completion of a specified motion utilizing the input device.

In some embodiments of the present invention, based on obtaining the selection, the program code designates a monitor of the two or more monitors comprising the location on the virtual desktop that corresponds to the selected location on the simulacrum, a primary monitor.

In some embodiments of the present invention, the program code records the designation in the operating system.

In some embodiments of the present invention, the two or more displays comprise graphical user interfaces.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the one or more computing resources executing the program code that performs certain aspects illustrated in FIGS. 1 and 4 can each be understood as a cloud computing node 10 (FIG. 6) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (IO) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
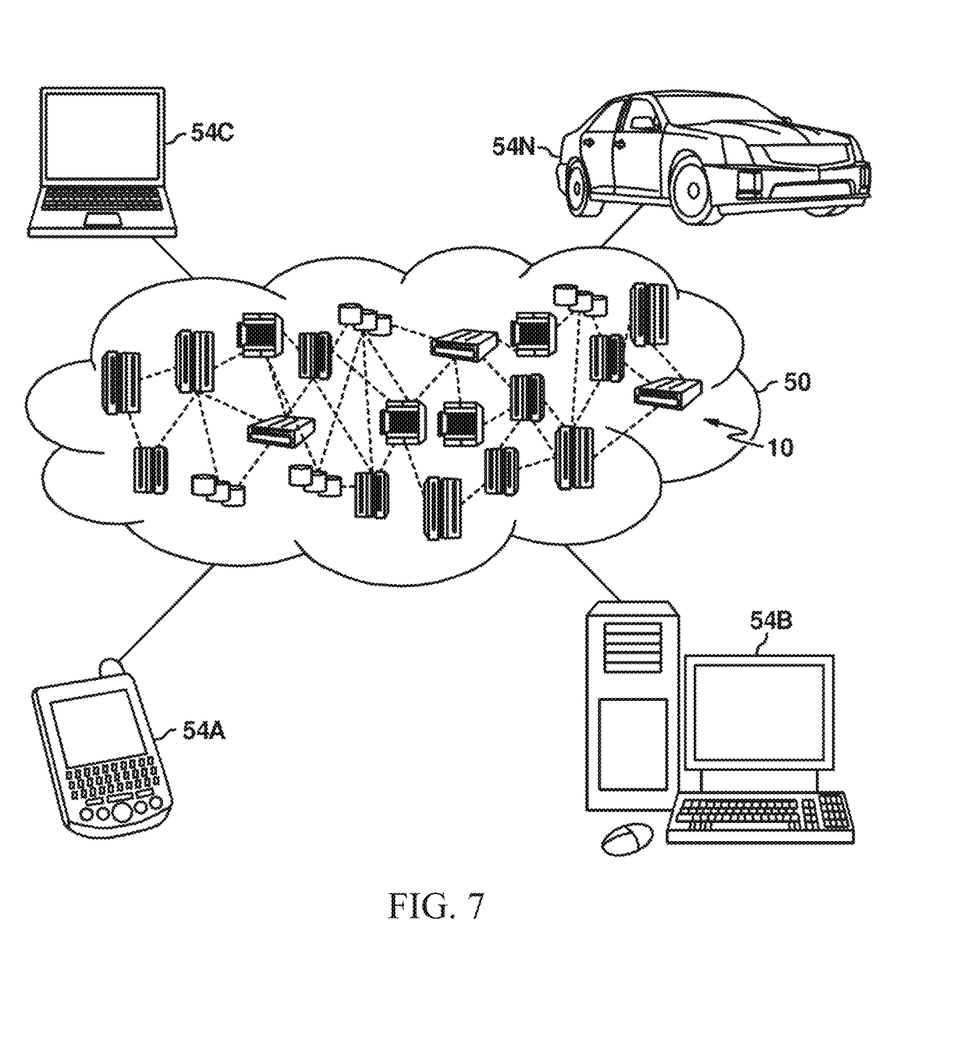
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
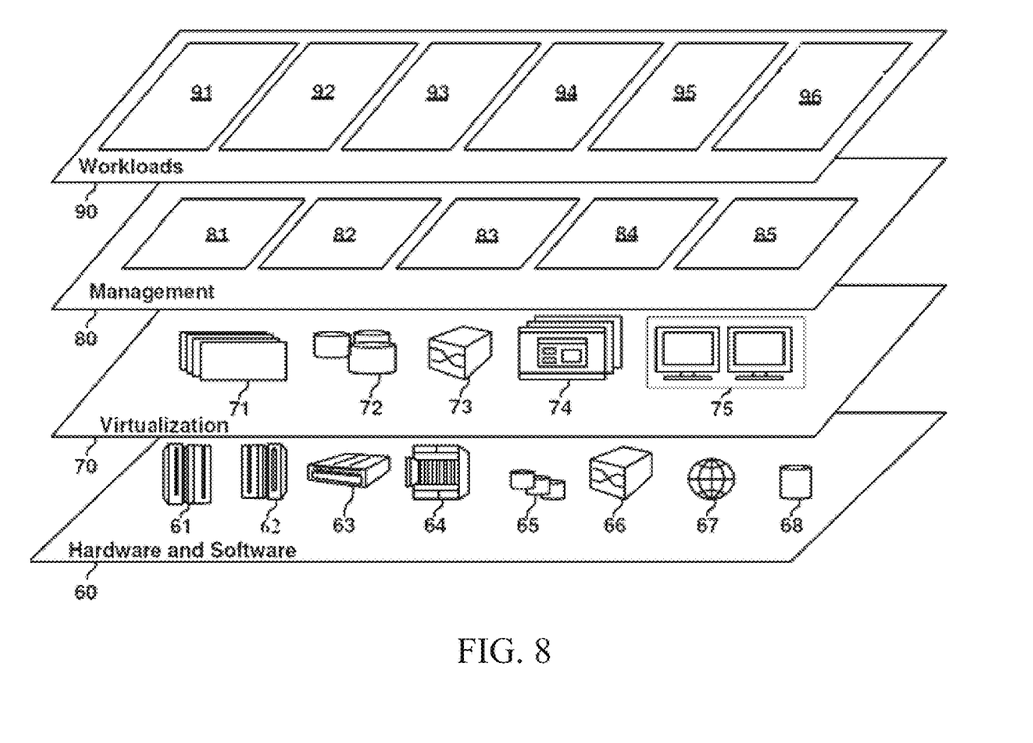
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a simulacrum of multiple displays of a computing system to enable direct cursor navigation from one display to another 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising
identifying, by one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors;
obtaining, by the one or more processors, based on the identifying, a display layout for the identified two or more displays;
obtaining, by the one or more processors, based on the identifying, resolutions of the two or more displays;
generating, by the one or more processors, based on the resolutions and the display layout, a virtual desktop comprising physical real estate of each of the two or more displays, wherein the physical real estate is useable by the one or more processors to render visual objects;
obtaining, by the one or more processors, a request, via the input device;
based on obtaining the request, generating, by the one or more processors, based on the resolutions and the display layout, a simulacrum of the two or more displays, in virtual space;

displaying, by the one or more processors, on a portion of the virtual desktop, the simulacrum;

obtaining, by the one or more processors, via the input device, a selection of a location on the simulacrum;

based on obtaining the selection, automatically moving, by the one or more processors, the cursor to a location on the virtual desktop that corresponds to the selected location on the simulacrum; and designating, by the one or more processors, a display of the two or more displays comprising the location on the simulacrum as a primary display, in an operating system executing on the one or more processors, by utilizing a communication interface of the operating system, based on obtaining the selection.

2. The computer-implemented method of claim 1, wherein obtaining the display layout and the resolutions comprises obtaining the display layout and the resolutions from an operating system installed on the computing device.

3. The computer-implemented method of claim 2, wherein obtaining the display layout and boundaries, further comprises communicating with the operating system utilizing the communication interface of the operating system.

4. The computer-implemented method of claim 3, wherein generating the virtual desktop comprises:
    facilitating, by the one or more processors, the operating system to generate the initial virtual desktop; and
    obtaining, by the one or more processors, the virtual desktop from the operating system.

5. The computer-implemented method of claim 2, wherein generating the simulacrum comprises:
    facilitating, by the one or more processors, the operating system to generate the simulacrum; and
    obtaining, by the one or more processors, the simulacrum from the operating system.

6. The computer-implemented method of claim 1, wherein the request is triggered, via the input device, by an action selected from the group consisting of: entry of a hotkey, entry of a pre-defined input on the input device, completion of entry of a pre-defined entry sequence, completion of entry of a combination of inputs, and completion of a specified motion utilizing the input device.

7. The computer-implemented method of claim 1, wherein the input device is selected from the group consisting of: a mouse and a keyboard.

8. The computer-implemented method of claim 1, wherein the selection of the location is facilitated via the input device with an action selected from the group consisting of: entry of a hotkey, entry of a pre-defined input on the input device, completion of entry of a pre-defined entry sequence, completion of entry of a combination of inputs, and completion of a specified motion utilizing the input device.

9. The computer-implemented method of claim 1, further comprising:
    based on obtaining the selection, designating, by the one or more processors, a monitor of the two or more monitors comprising the location on the virtual desktop that corresponds to the selected location on the simulacrum, a primary monitor.

10. The computer-implemented method of claim 9, wherein the designating comprises recording the designation in the operating system.

11. The computer-implemented method of claim 1, wherein the two or more displays comprise graphical user interfaces.

12. A computer program product comprising:
    a non-transitory computer readable storage medium readable by one or more processors and storing instructions for execution by the one or more processors for performing a method comprising:
        identifying, by the one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors;
        obtaining, by the one or more processors, based on the identifying, a display layout for the identified two or more displays;
        obtaining, by the one or more processors, based on the identifying, resolutions of the two or more displays;
        generating, by the one or more processors, based on the resolutions and the display layout, a virtual desktop comprising physical real estate of each of the two or more displays, wherein the physical real estate is useable by the one or more processors to render visual objects;
        obtaining, by the one or more processors, a request, via the input device;
        based on obtaining the request, generating, by the one or more processors, based on the resolutions and the display layout, a simulacrum of the two or more displays, in virtual space;
        displaying, by the one or more processors, on a portion of the virtual desktop, the simulacrum;
        obtaining, by the one or more processors, via the input device, a selection of a location on the simulacrum;
        based on obtaining the selection, automatically moving, by the one or more processors, the cursor to a location on the virtual desktop that corresponds to the selected location on the simulacrum; and
        designating, by the one or more processors, a display of the two or more displays comprising the location on the simulacrum as a primary display, in an operating system executing on the one or more processors, by utilizing a communication interface of the operating system, based on obtaining the selection.

13. The computer program product of claim 12, wherein obtaining the display layout and the resolutions comprises obtaining the display layout and the resolutions from an operating system installed on the computing device.

14. The computer program product of claim 13, wherein obtaining the display layout and boundaries, further comprises communicating with the operating system utilizing the communication interface of the operating system.

15. The computer program product of claim 14, wherein generating the virtual desktop comprises:
    facilitating, by the one or more processors, the operating system to generate the initial virtual desktop; and
    obtaining, by the one or more processors, the virtual desktop from the operating system.

16. The computer program product of claim 13, wherein generating the simulacrum comprises:
    facilitating, by the one or more processors, the operating system to generate the simulacrum; and
    obtaining, by the one or more processors, the simulacrum from the operating system.

17. The computer program product of claim 12, wherein the request is triggered, via the input device, by an action selected from the group consisting of: entry of a hotkey, entry of a pre-defined input on the input device, completion of entry of a pre-defined entry sequence, completion of entry of a combination of inputs, and completion of a specified motion utilizing the input device.

18. The computer program product of claim 12, wherein the input device is selected from the group consisting of: a mouse and a keyboard.

19. The computer program product of claim 12, wherein the selection of the location is facilitated via the input device with an action selected from the group consisting of:
  entry of a hotkey, entry of a pre-defined input on the input device, completion of entry of a pre-defined entry sequence, completion of entry of a combination of inputs, and completion of a specified motion utilizing the input device.

20. A system comprising:
  a memory;
  one or more processors in communication with the memory;
  program instructions executable by the one or more processors via the memory to perform a method, the method comprising:
    identifying, by the one or more processors of a computing device, two or more displays communicatively coupled to the one or more processors, wherein the two or more displays are utilized by the one or more processors to render visual objects to a user of the computing device, wherein a cursor is a visual object of the visual objects, wherein the one or more processors obtain instructions to render the cursor in various locations on the two or more displays via an input device communicatively coupled to the one or more processors;
    obtaining, by the one or more processors, based on the identifying, a display layout for the identified two or more displays;
    obtaining, by the one or more processors, based on the identifying, resolutions of the two or more displays;
    generating, by the one or more processors, based on the resolutions and the display layout, a virtual desktop comprising physical real estate of each of the two or more displays, wherein the physical real estate is useable by the one or more processors to render visual objects;
    obtaining, by the one or more processors, a request, via the input device;
    based on obtaining the request, generating, by the one or more processors, based on the resolutions and the display layout, a simulacrum of the two or more displays, in virtual space;
    displaying, by the one or more processors, on a portion of the virtual desktop, the simulacrum;
    obtaining, by the one or more processors, via the input device, a selection of a location on the simulacrum;
    based on obtaining the selection, automatically moving, by the one or more processors, the cursor to a location on the virtual desktop that corresponds to the selected location on the simulacrum; and
    designating, by the one or more processors, a display of the two or more displays comprising the location on the simulacrum as a primary display, in an operating system executing on the one or more processors, by utilizing a communication interface of the operating system, based on obtaining the selection.

* * * * *